United States Patent
Isozaki

(10) Patent No.: US 7,509,488 B2
(45) Date of Patent: Mar. 24, 2009

(54) SERVER APPARATUS, COMMUNICATION TERMINAL APPARATUS, DELIVERY SYSTEM AND DELIVERY PROGRAM

(75) Inventor: Yoshimasa Isozaki, Hamakita (JP)

(73) Assignee: Yamaha Corporation, Shizuoka-Ken (JP)

( * ) Notice: Subject to any disclaimer, the term of this patent is extended or adjusted under 35 U.S.C. 154(b) by 747 days.

(21) Appl. No.: 10/386,865

(22) Filed: Mar. 12, 2003

(65) Prior Publication Data

US 2003/0182581 A1 Sep. 25, 2003

(30) Foreign Application Priority Data

Mar. 22, 2002 (JP) ............... 2002-080506

(51) Int. Cl.
*H04L 9/00* (2006.01)
(52) U.S. Cl. .............. 713/155; 713/150; 709/225; 380/229; 705/67
(58) Field of Classification Search .............. 705/51; 726/27; 713/182
See application file for complete search history.

(56) References Cited

U.S. PATENT DOCUMENTS

| | | | |
|---|---|---|---|
| 5,908,469 A * | 6/1999 | Botz et al. | 726/4 |
| 6,148,342 A * | 11/2000 | Ho | 709/225 |
| 6,725,219 B2 * | 4/2004 | Nelson et al. | 707/10 |
| 6,760,344 B2 * | 7/2004 | Mizell et al. | 370/475 |
| 6,868,403 B1 * | 3/2005 | Wiser et al. | 705/51 |
| 6,910,024 B2 * | 6/2005 | Krishnamurthy et al. | 705/400 |
| 2003/0093697 A1 * | 5/2003 | Lin | 713/202 |

FOREIGN PATENT DOCUMENTS

JP 2001-222496 8/2001

OTHER PUBLICATIONS

Japanese Office Action dated Sep. 9, 2005 regarding Japanese Patent Application No. 2002-080506.
Kazuki Kashahara, "Follow-up Report! Performance Test on Pentium III-capable Applications and Compatible Chip Mother" DOS/V Magazine, Softbank Publishing Inc., May 1, 1999, vol. 8, No. 9, pp. 130-137.
Decision of Refusal issued on Oct. 10, 2006 on Japanese Patent Application No. 2002-080506.

* cited by examiner

*Primary Examiner*—Kambiz Zand
*Assistant Examiner*—Roderick Tolentino
(74) *Attorney, Agent, or Firm*—Harness, Dickey & Pierce, PLC

(57) ABSTRACT

There is provided a server apparatus that realizes a suitable delivery service according to requests by performing a highly secure and easy-to-understand authentication while allowing anonymity to be maintained. During connection to the server apparatus, a communication terminal apparatus transmits an appliance type ID and a user ID to the server apparatus according to depression states of authentication buttons. The server apparatus receives the transmitted appliance type ID and user ID, determines the authentication level based on the received appliance type ID and user ID, selects a service content to be provided according to the determined authentication level, and transmits corresponding delivery data to the communication terminal apparatus. As a result, suitable data for requests from the user side can be delivered.

3 Claims, 6 Drawing Sheets

FIG. 4

| | | | | |
|---|---|---|---|---|
| APPLIANCE AUTHENTICATION BUTTON | ON | ON | OFF | OFF |
| USER AUTHENTICATION BUTTON | ON | OFF | ON | OFF |
| AUTHENTICATION LEVEL | A | B | C | D |
| AUTHENTICATION CONTENT | AUTHENTICATION OF BOTH APPLIANCE AND USER | AUTHENTICATION OF APPLIANCE, USER KEPT ANONYMOUS | STANDARD USER AUTHENTICATION | COMPLETE ANONYMITY |
| SERVICE CONTENT (EXAMPLE) | FEE-BASED SERVICE ORIENTED TOWARDS MEMBERS | FREE SERVICE ORIENTED TOWARDS APPLIANCES | STANDARD FEE-BASED SERVICE | STANDARD WEB USER SERVICE |

SERVER APPARATUS, COMMUNICATION TERMINAL APPARATUS, DELIVERY SYSTEM AND DELIVERY PROGRAM

BACKGROUND OF THE INVENTION

1. Field of the Invention

The present invention relates to a server apparatus, a communication terminal apparatus, a delivery system, and a delivery program that perform a delivery service via a network.

2. Description of the Related Art

Conventionally, delivery services that transmit various types of data from a server apparatus via a network to a communication terminal apparatus on the user side have been performed. When performing such services, authentication of the users is performed in some cases. For example, when a delivery service is received by a personal computer connected via the Internet, user authentication can be performed without complicated operations if the server apparatus has a terminal apparatus automatically transmit and receive a cookie that is stored by a browser.

However, in the above conventional authentication method, from the user's viewpoint, a unique user ID and a variety of information are automatically transmitted, so that there has been the problem that while the connection procedure is simplified, the user's privacy is decreased without exception and security is low.

A user who wishes to remain anonymous can receive the provision of a service with his or her anonymity maintained by making a desired selection from a menu displayed on a website every time the user connects, for example. However, the input operation that needs to be performed in such a case is both difficult to understand and troublesome.

On the other hand, depending on the type of data to be delivered, it may not be especially necessary for the server side to authenticate the user. Where user authentication is strictly performed for all users, the users of a service will be excessively restricted, which hinders the widespread use of the service.

SUMMARY OF THE INVENTION

It is an object of the present invention to provide a server apparatus, a communication terminal apparatus, a delivery system, and a delivery program which allow anonymity to be maintained and can realize a suitable delivery service for requests by performing an easy-to-understand and highly secure authentication.

To attain the above object, the present invention provides a server apparatus that provides delivery services to a plurality of communication terminal apparatuses connected to the server apparatus via a network, for communication therewith, the server apparatus comprising a specifying information receiver that receives a plurality of pieces of user specifying information transmitted from the communication terminal apparatuses and having different attributes, an authentication that performs authentication based on a result of reception of each of the plurality of pieces of user specifying information by the specifying information receiver, a data selector that selects data to be delivered based on a result of authentication by the authentication device, and a data transmitter that transmits the data selected by the data selector to one of the communication terminal apparatuses that transmitted each of the plurality of pieces of user specifying information.

With the above construction, anonymity can be maintained and a suitable delivery service for requests can be realized by performing an easy-to-understand and highly secure authentication.

Preferably, the plurality of pieces of user specifying information include at least appliance identification information that specifies each of the communication terminal apparatuses and user identification information that specifies a user.

By having authentication performed separately for respective communication terminal apparatuses and users using the above user specifying information, for example, suitable delivery data for the authentication level can be delivered.

To attain the above object, the present invention provides a communication terminal apparatus connected to a server apparatus via a network, for communication therewith, to receive a delivery service provided by the server apparatus, the communication terminal apparatus comprising a transmission permission/inhibition setting device capable of separately setting whether transmission of each of a plurality of pieces of user specifying information with different attributes is to be permitted or inhibited, a specifying information transmitter that transmits piece of the user specifying information for which transmission has been set to be permitted by the transmission permission/inhibition setting device to the server apparatus in order to receive the service, and a data receiver that receives delivery data transmitted from the server apparatus based on a result of transmission of the specifying information by the specifying information transmitter.

With the above construction, anonymity can be maintained and a suitable delivery service for requests can be realized by performing an easy-to-understand and highly secure authentication.

Preferably, the plurality of pieces of user specifying information include at least appliance identifying information that specifies the communication terminal apparatus and user identification information that specifies a user.

By having authentication performed separately for respective communication terminal apparatuses and users using the above user specifying information, for example, suitable delivery data for the authentication level can be delivered.

To attain the stated object the present invention provides a delivery system comprising a network, a server apparatus that provides a delivery service, and a plurality of communication terminal apparatuses that receive the delivery service from the server apparatus, the communication terminal apparatuses being connected to with the server apparatus via the network, for communication therewith, the communication terminal apparatuses each comprising a transmission permission/inhibition setting device capable of separately setting whether transmission of each of a plurality of pieces of user specifying information with different attributes is to be permitted or inhibited, a specifying information transmitter that transmits a piece of the user specifying information for which transmission has been set to be permitted by the transmission permission/inhibition setting device to the server apparatus in order to receive the service, and a data receiver that receives delivery data transmitted from the server apparatus based on a result of transmission of the specifying information by the specifying information transmitter, and the server apparatus comprising a specifying information receiver that receives the plurality of pieces of user specifying information transmitted from the specifying information transmitter of each of the communication terminal apparatuses and having different attributes, an authentication device that performs authentication based on a result of reception of each of the plurality of pieces of user specifying information by the specifying information receiver, a data selector that selects data to be delivered based on a result of authentication by the authentication device, and a data transmitter that transmits, as the delivery data, the data selected by the data selector to one of the communication terminal apparatuses that transmitted each of the plurality of pieces of user specifying information.

With the above construction, anonymity can be maintained and a suitable delivery service for requests can be realized by performing an easy-to-understand and highly secure authentication.

To attain the above object the present invention provides a delivery program executed by a server apparatus that provides a delivery service to a plurality of communication terminal apparatuses connected to the server apparatus via a network, for communication therewith, the delivery program comprising a specifying information receiving module for receiving a plurality of pieces of user specifying information transmitted from the communication terminal apparatuses and having different attributes, an authentication module for performing authentication based on a result of reception of each of the plurality of pieces of user specifying information by the specifying information receiving module, a data selecting module for selecting data to be delivered based on a result of authentication by the authentication module, and a data transmission module for transmitting the data selected by the data selecting module to one of the communication terminal apparatuses that transmitted the each of the plurality of pieces of user specifying information.

With the above construction, anonymity can be maintained and a suitable delivery service for requests can be realized by performing an easy-to-understand and highly secure authentication.

A computer-readable storage medium that stores the above delivery program also constitutes the present invention.

The above and other objects, features, and advantages of the invention will become more apparent from the following detailed description taken in conjunction with the accompanying drawings.

BRIEF DESCRIPTION OF THE DRAWINGS

FIG. 4 is a diagram showing the correspondence between authentication levels and depression states of authentication buttons;

DETAILED DESCRIPTION OF THE PREFERRED EMBODIMENTS

The present invention will now be described with reference to the accompanying drawings showing a preferred embodiment thereof.

Figure 1:
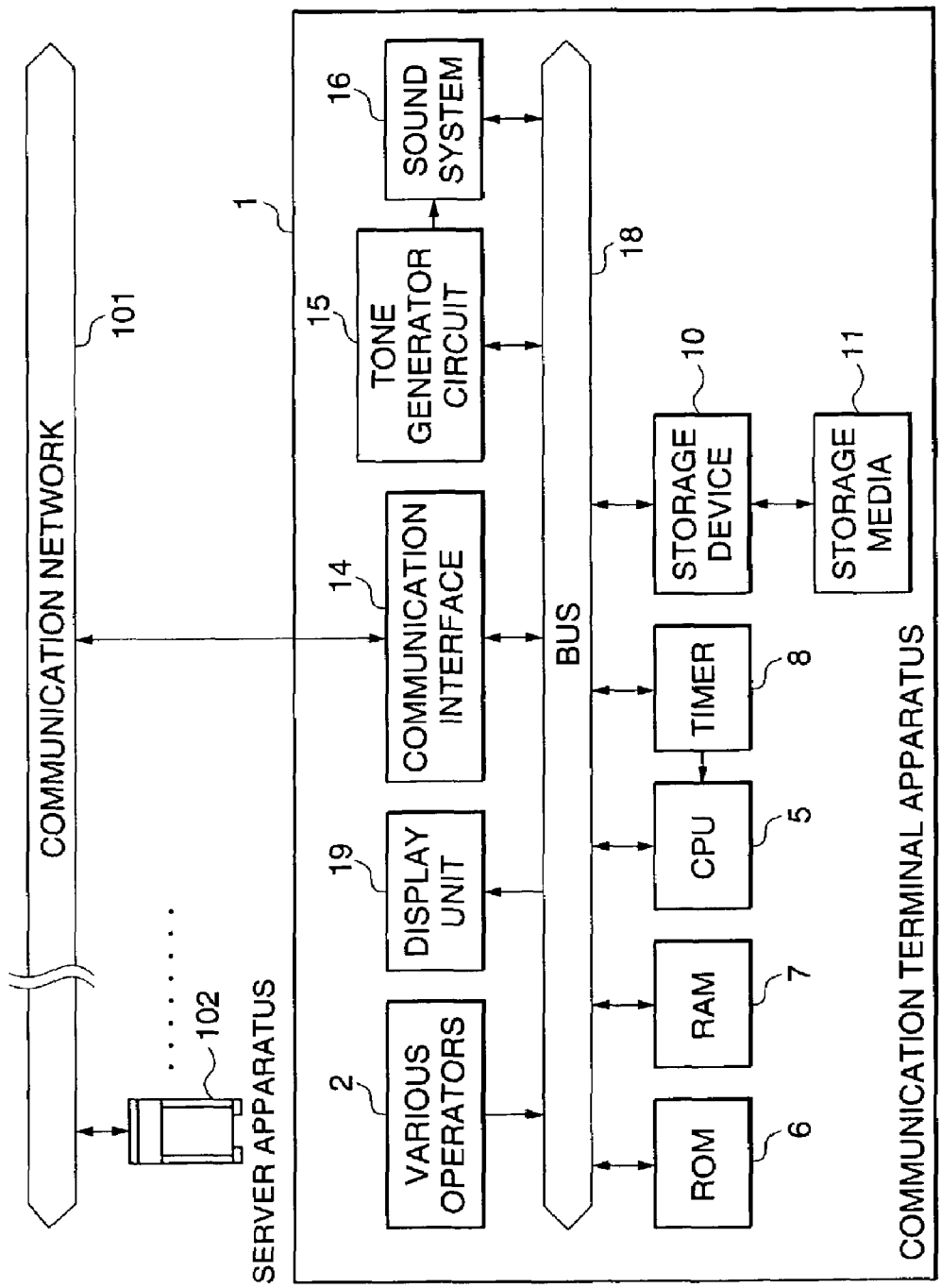
FIG. 1 is a block diagram showing the overall construction of a delivery system according to an embodiment of the present invention.

FIG. 1 is a block diagram showing the overall construction of a delivery system according to an embodiment of the present invention. This system is comprised of a server apparatus 102 and a communication terminal apparatus 1 that are connected via a communication network 101 for communication with each other. The server apparatus 102 serves as a server computer that provides a delivery service for data. A plurality of server apparatuses 102 may be present. The communication terminal apparatus 1 is used by a user and serves as a client apparatus for the delivery service. The communication terminal apparatus 1 may be composed of an electronic terminal apparatus, such as a personal computer or an electronic musical instrument. A plurality of communication terminal apparatuses 1 with a similar construction may be present.

The communication terminal apparatus 1 includes various operators (operating elements) 2, a ROM 6, a RAM 7, a timer 8, a storage device 10, a communication interface 14, a tone generator circuit 15, a sound system 16, and a display unit 19, with these components being respectively connected to a CPU 5 via a bus 18.

The CPU 5 controls the entire communication terminal apparatus 1. The ROM 6 stores control programs that are executed by the CPU 5 and a variety of table data. The RAM 7 temporarily stores a variety of input information, such as text data, various flags, various registers and operation results. The timer 8 is connected to the CPU 5 and keeps time for an interrupt period during timer interrupt processing and various other time periods. The storage device 10 includes various kinds of drives for driving storage media 11 such as a hard disk, and a floppy (registered trademark) disk. The storage media 11 can store a variety of programs and a variety of data, in addition to the control programs mentioned above.

Figure 2:
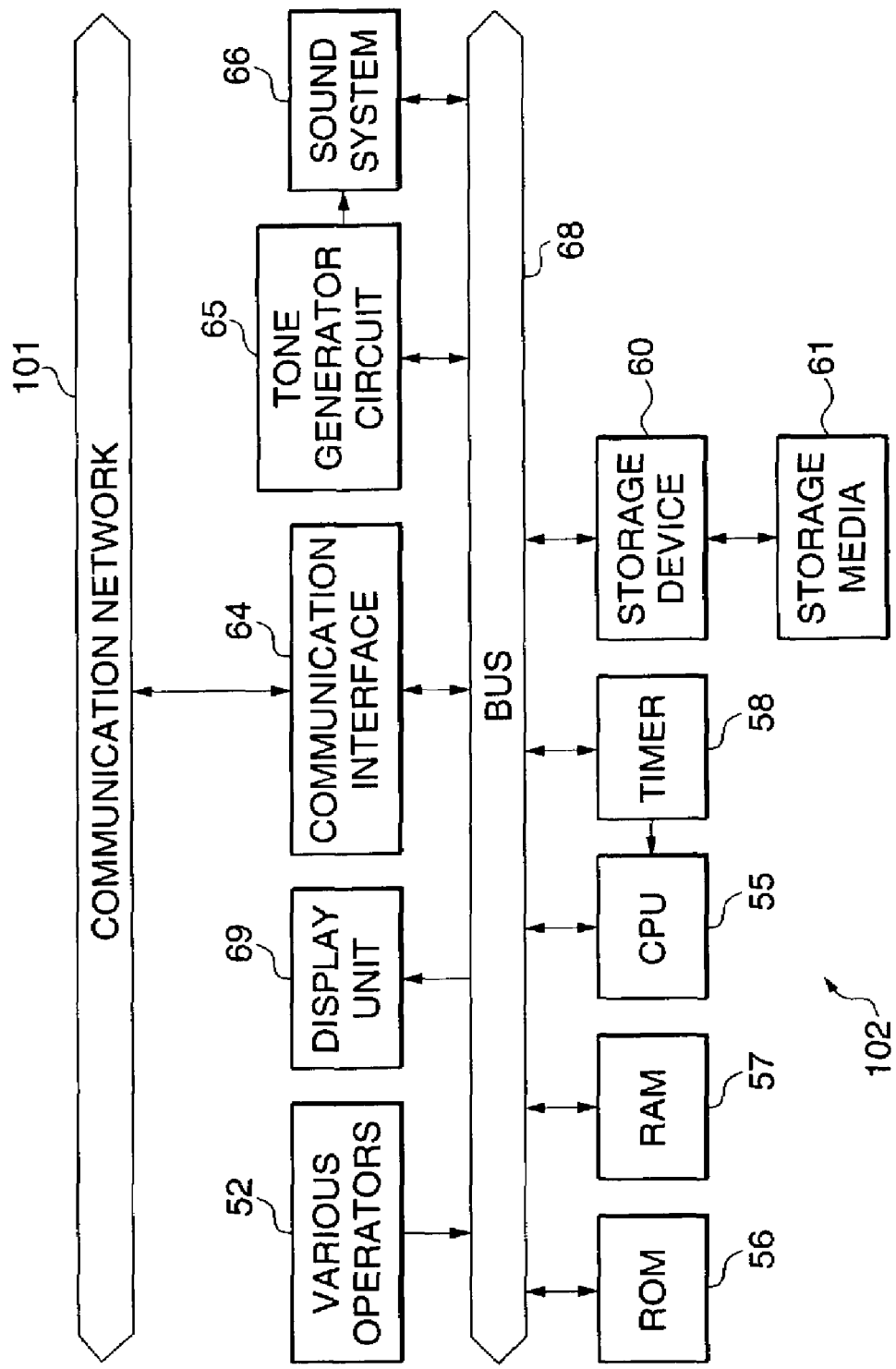
FIG. 2 is a block diagram schematically showing the overall construction of a server apparatus in FIG. 1.

The various operators 2 include a plurality of switches that are used to input a variety of information, and further include an appliance authentication button 3 and a user authentication button 4, as shown in FIG. 2, that will be described later. The display unit 19 is composed of an LCD or the like, and displays status displays for a delivery service or the like, displays relating to the execution of an application, information relating to various settings, and the like. The communication interface 14 connects the communication terminal apparatus 1 to the server apparatus 102 via the communication network 101, which is the Internet or the like, and so makes it possible to transmit and receive data. The tone generator circuit 15 converts a performance signal into a musical tone signal, and the sound system 16 applies various effects to the musical tone signal inputted from the tone generator circuit 15 and converts the signal into musical sound.

FIG. 2 is a block diagram showing the construction of the server apparatus 102. The server apparatus 102 is comprised of various operators (operating elements) 52, a ROM 56, a RAM 57, a timer 58, a storage device 60, a communication interface 64, a tone generator circuit 65, a sound system 66, and a display unit 69, with these components being respectively connected to a CPU 55 via a bus 68. These component elements are similar in construction to the corresponding elements in the communication terminal apparatus 1, except that the various operators 52 do not include buttons that correspond to the appliance authentication button 3 and the user authentication button 4.

Figure 3A:
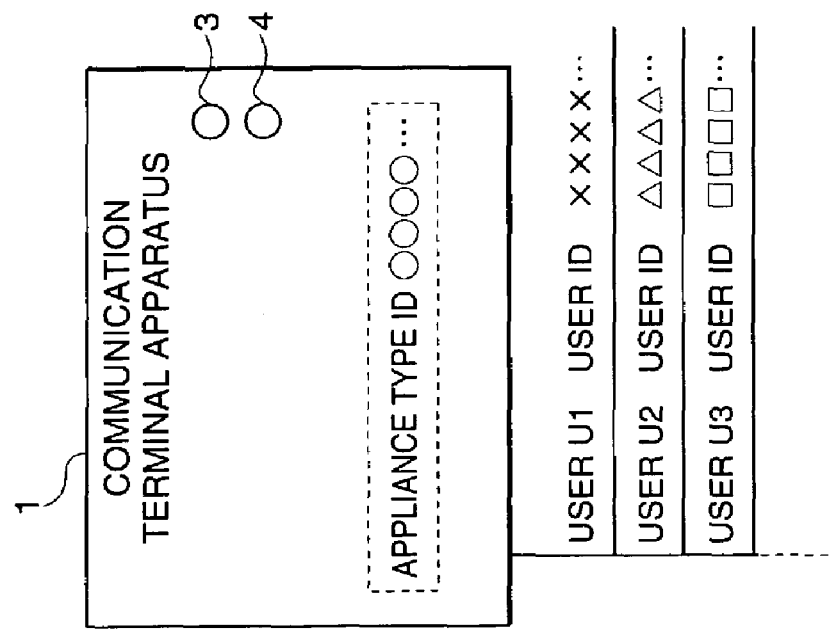
FIG. 3A is a diagram schematically showing the structure of appliance information and user information in the server apparatus.
Figure 3B:
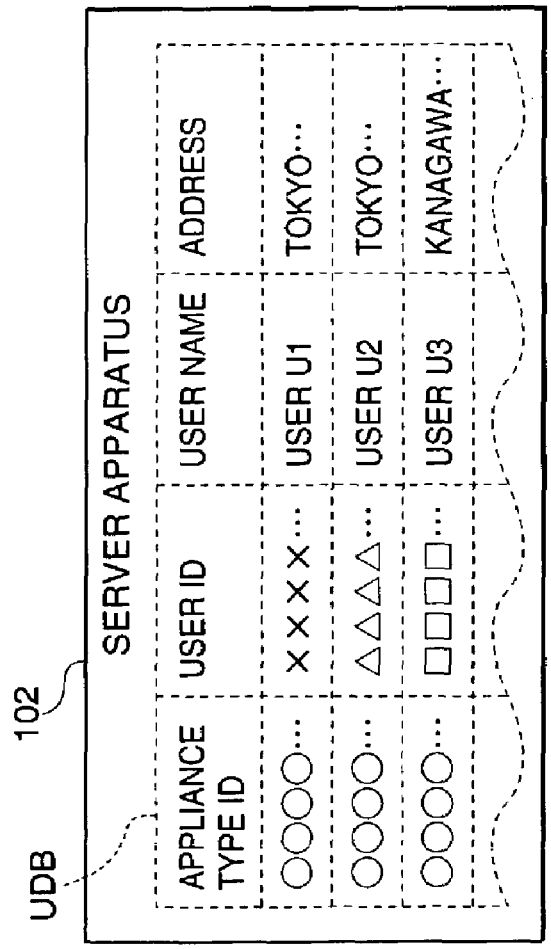
FIG. 3B is a diagram schematically showing the structure of appliance information and user information in a communication terminal apparatus in FIG. 1.

FIG. 3A is a diagram schematically showing the structure of appliance information and user information in the server apparatus. FIG. 3B is a diagram schematically showing the structure of appliance information and user information in the communication terminal apparatus 1. The communication terminal apparatus 1 includes the appliance authentication button 3 and the user authentication button 4 mentioned above. The appliance authentication button 3 is pressed when authentication of the communication terminal apparatus 1 that is connecting for communication is desired. The user authentication button 4 is pressed when authentication of the user who is presently using the communication terminal apparatus 1 that is connecting for communication is desired.

To receive a delivery service, the user first performs user registration. This user registration is usually performed when the user purchases the communication terminal apparatus 1. Each communication terminal apparatus 1 is provided with an appliance ID (a serial number) and an appliance type ID (appliance identification information) as unique information for the communication terminal apparatus 1. Such information is assigned to each communication terminal apparatus 1 before the communication terminal apparatus 1 is shipped, is stored in the communication terminal apparatus 1, and cannot be changed thereafter by the user. The appliance type ID is information showing the classification, appliance type, and version, etc., of the communication terminal apparatus 1. It should be noted that the communication terminal apparatus 1 is not limited to being used by a single user. For example, there are cases where a plurality of users (numbered U1, U2, U3, etc.) make common use of a communication terminal apparatus 1 in a company section. There are also cases where the same user uses a plurality of communication terminal apparatuses 1. Accordingly, when common use is made of communication terminal apparatuses 1, it is necessary for user registration to be performed for each communication terminal apparatus 1 and for each user.

To register a user, the communication terminal apparatus 1 connects to the server apparatus 102 via the communication interface 14 and the appliance ID, appliance type ID and user ID (user identification information) are transmitted to the server apparatus 102. Here, the appliance ID and the user ID form user specifying information, singly or in combination. The user ID is unique information for specifying individual users and is determined by the user, though such information may alternatively be determined by the server apparatus 102. It should be noted that when the user ID and the like is transmitted, personal information such as a user name, address, etc., is also transmitted as necessary.

In the server apparatus 102, when an appliance ID, an appliance type ID and a user ID, etc., which are transmitted, have been received, the received appliance ID and the received appliance type ID that corresponds to this appliance ID are correlated with the received user ID and personal information to construct a database. Thus, as shown in FIG. 3A, a user database UDB is constructed in the server apparatus 102 (specifically in the storage device 60 of the server apparatus 102).

FIG. 4 is a diagram showing the correspondence between authentication levels and depression states of the authentication buttons As described later, according to the depression states of the authentication buttons 3 and 4, the appliance type ID and the user ID are transmitted from the communication terminal apparatus 1 when the communication terminal apparatus 1 connects to the server apparatus 102. When the appliance authentication button 3 and the user authentication button 4 are in a pressed state (i.e., the pressing state is ON), the appliance type ID and the user ID are transmitted, respectively.

The server apparatus 102 determines the authentication level according to whether one or both of the appliance type ID and the user ID have been transmitted to the server apparatus 102, and selects the service content to be provided according to this authentication level.

As one example, as shown in FIG. 4, if the respective depression states of the appliance authentication button 3 and the user authentication button 4 are ON and ON when the communication terminal apparatus 1 connects to the server apparatus 102, the server apparatus 102 determines that the authentication level is A. If the depression states are ON and OFF, the server apparatus 102 determines that the authentication level is B. If the depression states are OFF and ON, the server apparatus 102 determines that the authentication level is C. If the depression states are OFF and OFF, the server apparatus 102 determines that the authentication level is D. The selection of the authentication content and service content (menu) are as follows. That is, when the authentication level is A, both the appliance and the user are authenticated, and a fee-based service for members or the like is selected. When the authentication level is B, the appliance only is authenticated and the user is treated as anonymous, with a free service for appliances or the like being selected. When the authentication level is C, a standard user authentication is performed to authenticate only the user, and a standard fee-based service or the like is selected. When the authentication level is D, neither the appliance nor the user is authenticated, so that the user is treated as completely anonymous and a standard Web user service or the like is selected.

In this way, the user can selectively depress the appliance authentication button 3 and the user authentication button 4 to separately set whether each of the appliance and the user is to be treated as anonymous, which improves the user-friendliness of the communication terminal apparatus 1. It should be noted that the mode where the user is anonymous can be used for participation in an online community, for example, while the mode where the user is not anonymous, that is "name mode", may be used for participation in an electronic conference where user handle names are used, for settling accounts during electronic business, for purchasing goods, etc.

Figure 5:
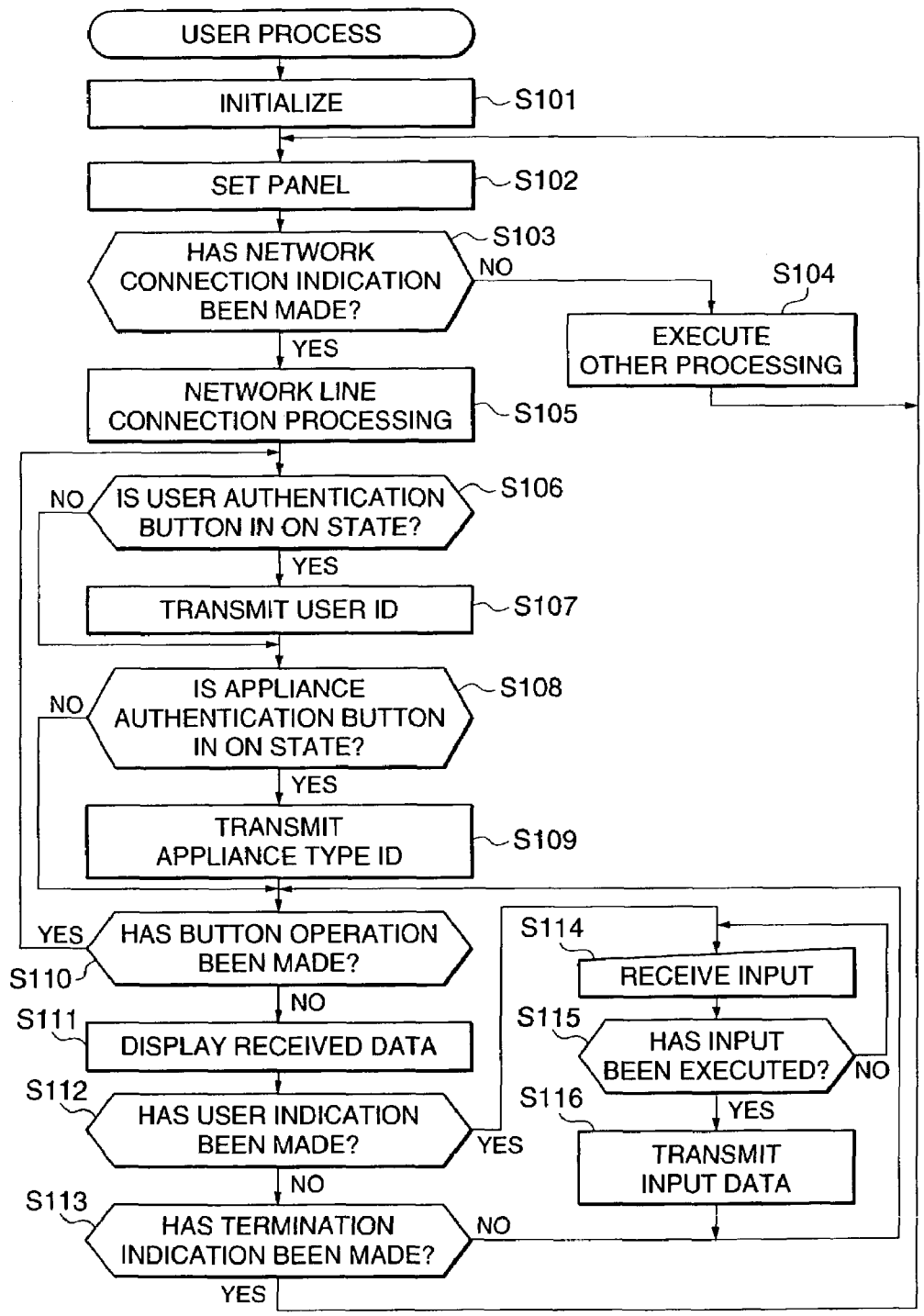
FIG. 5 is a flow chart showing a user process executed on the communication terminal apparatus side.

FIG. 5 is a flow chart showing a user process executed by the communication terminal apparatus. This process is started when the power is turned on.

First, initialization is executed, that is, the execution of a predetermined program is started, the RAM 7, various registers, etc., are cleared and initial settings are performed (step S101). Panel setting processing is executed, that is, operations of the various operators 2 are received, and instructions for appliance settings, a mode selection, etc., are executed (step S102).

Next, it is determined whether the panel setting processing mentioned above is an instruction for connecting to the network (step S103), and when this is not the case, other processing is executed in accordance with the panel setting (step S104), and then the process returns to step S102. On the other hand, when the panel setting is an instruction for connecting to the network, network line connection processing is executed (step S105). That is, software such as a browser is launched, initialization is performed, a connection is made to the communication network 101, initialization processing or the like is performed with the server apparatus 102, and a connection is established.

Next, it is determined whether the user authentication button 4 is in the ON state (step S106). When this is the case, the user ID of the user who is currently using the communication terminal apparatus 1 is transmitted via the communication network 101 to the server apparatus 102 (step S107), and the process proceeds to step S108. It should be noted that the user ID of the user currently using the communication terminal apparatus 1 is assumed to have been inputted by the panel setting processing in step S102 mentioned above. Conversely, when the user authentication button 4 is not in the ON state, the process proceeds to step S108 without the user ID being transmitted. In this case, instead of simply not transmitting the user ID, it is possible to transmit information indicating that the transmission of the user ID has been refused.

In step S108, it is determined whether the appliance authentication button 3 is in the ON state. When this is the case, the appliance type ID of this communication terminal apparatus 1 is transmitted via the communication network 101 to the server apparatus 102 (step S109), and the process proceeds to step S110. Conversely, when the appliance authentication button 3 is not in the ON state, the process proceeds to step S110 without the appliance type ID being transmitted. In this case as well, it is possible to transmit information indicating that the transmission of the appliance type ID has been refused.

In step S110, it is determined whether the appliance authentication button 3 or the user authentication button 4 has been operated. This processing is mainly for dealing with a case where the user wishes to change the service content and type during connection with the server apparatus 102, for example, when the authentication level is "B" with the appliance authentication button 3 ON and the user authentication button 4 OFF, the user authentication button 4 is turned on so that the authentication level is changed to "A". When the determination in step S110 finds that either of the buttons has been operated, the process returns to step S106, while when neither button has been operated, the process proceeds to step S111.

Figure 6:
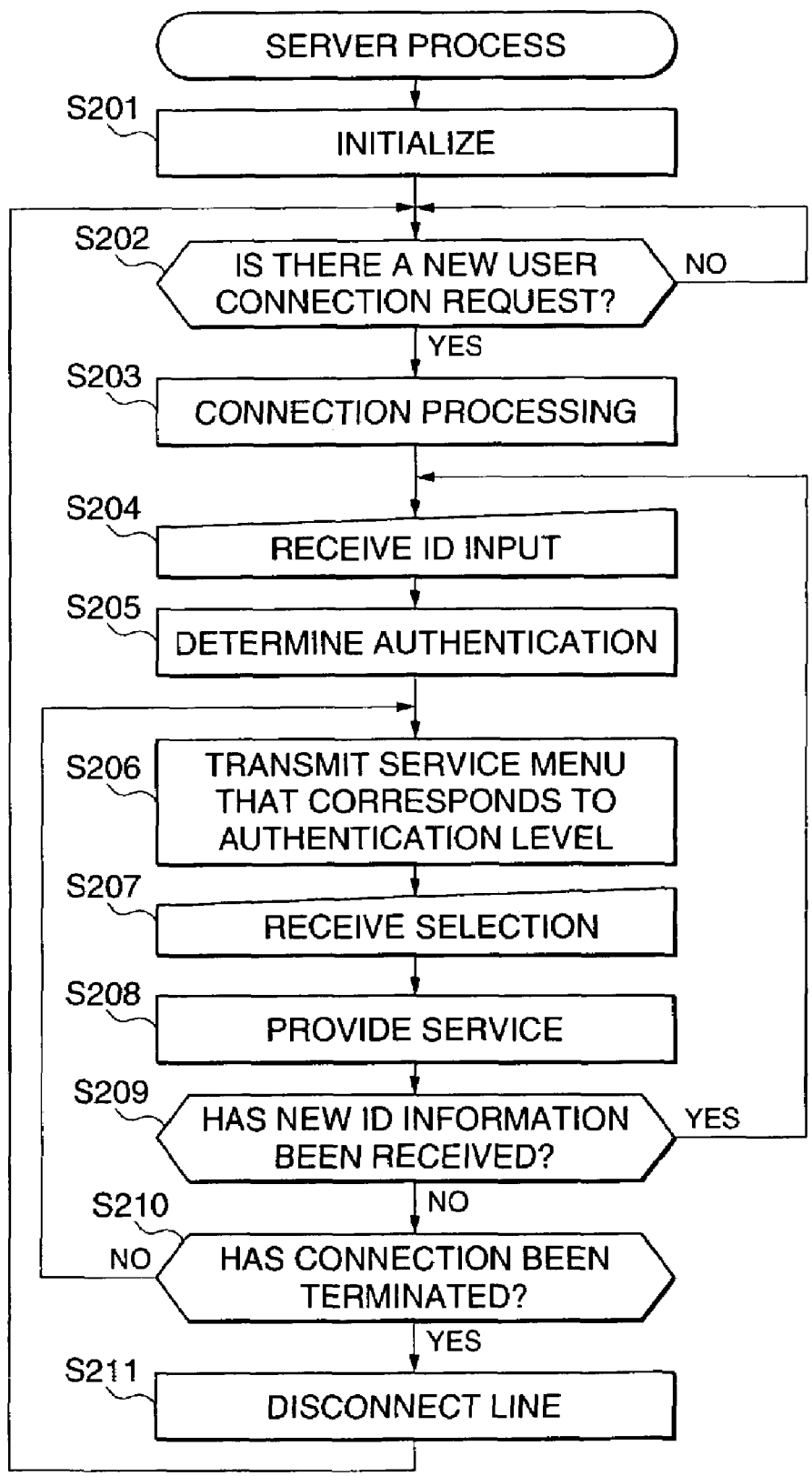
FIG. 6 is a flow chart showing a server process executed on the server apparatus side.

In step S111, data that has been transmitted from the server apparatus 102 and received via the communication interface 14 is displayed by the display unit 19. In a server process that is shown in FIG. 6 and will be described later, the authentication level is determined by the server apparatus 102 and data corresponding to the determined authentication level is transmitted as delivery data. Accordingly, in the processing in step S111, screen information for a menu screen and the like that is transmitted from the server apparatus 102 is displayed, with the delivery data mentioned above also being displayed as necessary.

Next, it is determined whether an instruction for executing an input operation such as a selection operation has been given by the user using the various operators 2 or the like (step S112). When an input instruction has been given, this input instruction is received (step S114), and it is determined whether an instruction for executing an input operation has been given via an enter key or the like (not shown in the figures) (step S115). When the determination in step S115 finds that no instruction has been given for executing an input operation, the process returns to step S114. Conversely, when an instruction has been given for executing an input operation, the input operation data that has been inputted is transmitted to the server apparatus 102 (step S116), and the process returns to step S110.

When the result of the determination in step S112 mentioned above is that no instruction has been given by the user, it is determined whether the user has given a termination instruction (step S113). When this is not the case, the process returns to step S110, while when the termination instruction has been given, the process returns to step S102.

FIG. 6 is a diagram showing a flowchart for the server process executed on the server apparatus 102 side.

First, initialization is executed, that is, after the power supply has been turned on, the execution of a predetermined program is started, the RAM 57, etc., are cleared, and initial settings and the like for connecting with the network are performed (step S201). Next, connection requests from the user are monitored via the communication network 101 and it is determined whether a new user connection request has been made for receiving a service (step S202). This determination is repeated until there is a new connection request, and when a new user connection request has been made, a connection process is performed, that is, the transmission and reception of data to and from the communication terminal apparatus 1 that issued the connection request is confirmed and a connection is established (step S203). It should be noted that data that is transmitted from the communication terminal apparatus 1 and includes the appliance type ID and the user ID is always received by the server apparatus 102.

Next, when the appliance type ID and/or user ID is received from the communication terminal apparatus 1, an input of the received ID information is received (step S204) and an authentication determination process is executed (step S205). As described above, this authentication determination process is based on the transmission result of the appliance type ID and user ID from the communication terminal apparatus 1 that is presently connected. Since the appliance type ID and user ID are transmitted or not transmitted depending upon the ON and OFF states of the appliance authentication button 3 and the user authentication button 4, the determined authentication level is one of the authentication levels A to D as shown in FIG. 4.

Next, a service menu that corresponds to the determined authentication level is transmitted to the communication terminal apparatus 1 (step S206). This service menu obviously differs depending on the authentication level, and is a menu that corresponds to one of the service contents (see FIG. 4) that can be used at the respective authentication levels. Next, a result of selection of the transmitted service menu from the communication terminal apparatus 1 is received (step S207). A service is provided by transmitting suitable data for the received selection to the communication terminal apparatus 1 as the delivery data (step S208). It should be noted that when it is necessary to transmit a new menu depending upon the selection result, this can be performed whenever the process returns to step S206.

Next, it is determined whether new ID information (a new appliance type ID or new user ID) has been received from the communication terminal apparatus 1 (step S209). For example, if during the connection the appliance authentication button 3 or the user authentication button 4 of the communication terminal apparatus 1 has been operated so as to change the service content and/or type, a new appliance type ID or a new user ID is transmitted in the process of steps S106 to S110 in FIG. 5, so that it is determined in step S209 whether such information has been received. When as a result of this determination, new ID information has been received, the process returns to steps S204 et seq. described above and the determination of the authentication level, etc. are performed again. On the other hand, when new ID information has not been received, the process proceeds to step S210 where it is determined whether a connection termination request has been made by the communication terminal apparatus 1. When a communication termination request has not been made, the process returns to step S206, while when a connection termination request has been made, line disconnection processing is executed (step S211), and the process returns to step S202.

According to the present embodiment, as described above, the appliance type ID and user ID are transmitted in accordance with the depression states of the appliance authentication button 3 and the user authentication button 4, and based on the received Ids, authentication is performed separately for communication terminal apparatuses and users, the authentication level is determined, and the service to be provided is selected in accordance with this authentication level. This makes it possible to deliver suitable data for requests from the user side. As a result, from the user's perspective, it is possible to freely select whether anonymity should be maintained separately for communication terminal apparatuses 1 and users, providing the advantages that a decrease in security due to private information universally becoming too accessible can be avoided and a drop in services due to excessive priority being placed on the protection of private information can also be avoided. By selectively operating the authentication buttons, the user and/or appliance can be set as anonymous via an easy operation. In addition to the operation being simple, the state of the settings can be easily understood at any time. On the server apparatus side, the degree of strictness of the user authentication can be set freely by the user, and therefore, unnecessary limitations cannot be placed on prospective users, which is advantageous in that it contributes to the widespread use of services. As a result, anonymity can be maintained and at the same time a suitable delivery service for requests can be achieved through an authentication that is both easy to understand and highly secure.

Also, even during a connection with the server apparatus 102, when the user wishes to change the service menu to be received, the authentication level can be changed by operating the authentication buttons, making the system very user-friendly.

It should be noted that while the user authentication button 4 is provided in the present embodiment, an "anonymity button" may be provided instead. In this case, the ON and OFF states of the "anonymity button" correspond to the OFF and ON states of the user authentication button 4.

Although in the present embodiment, the appliance authentication button 3 and the user authentication button 4 are composed of push buttons, this is not a limitation for the present invention so long as the ON and OFF settings can be made. For example, these authentication buttons may be composed of buttons that are clicked on the screen.

Although while an appliance type ID and a user ID are used as the identification information that serves as parameters for the determination of the authentication level, the identification information is not limited to these two types, and three or more types of identification information may be used, insofar as the attributes of the types differ from each other. For example, in addition to individual IDs that specify individual users, it is possible to use a plurality of types of identification information that can specify groups of different categories, such as company section IDs and group IDs, that specify a section or group to which the user belongs. This makes it possible to provide a more precise selection of services.

It is to be understood that the object of the present invention may also be accomplished by supplying a system or an apparatus with a storage medium on which a program code of software which realizes the functions of the above described embodiment is recorded, and causing a computer (or CPU or MPU) of the system or apparatus to read out and execute the program code stored on the storage medium.

In this case, the program code itself that is read out from the storage medium realizes the functions of the embodiment described above, and hence the storage medium on which the program code is stored constitutes the present invention. Also, in a case where the program code is supplied via a transmission medium or the like, the program code itself constitutes the present invention. It should be noted that the storage medium for supplying the program code is not limited to a ROM, and a floppy (registered trademark) disk, a hard disk, an optical disk, a magnetic-optical disk, a CD-ROM, a CD-R, a CD-RW, a DVD-ROM, a DVD-RAM, a DVD-R, a DVD-RW, a DVD+RW, an NV-RAM, a magnetic tape, a nonvolatile memory card, and a download performed via a network may be used.

Further, it is to be understood that the functions of the above described embodiment may be accomplished not only by executing a program code read out by a computer, but also by causing an OS (operating system) or the like which operates on the computer to perform a part or all of the actual operations based on instructions of the program code. Further, it is to be understood that the functions of the above described embodiment may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A communication terminal apparatus connected to a server apparatus via a network, for communication therewith, to receive a delivery service provided by the server apparatus, the communication terminal apparatus comprising:

a setting device that includes a plurality of authentication buttons each dedicated for selecting one of ON status and OFF status regarding one of a plurality of different attributions by a user, and incorporates one of more attributes, selected as ON status by one of more of the plurality of authentication buttons, as user specifying information, wherein each combination of ON status or OFF status of the plurality of different attributes corresponds to a different authentication level to be desired by the user;

a specifying information transmitter that transmits concurrently to the server apparatus the user specifying information including the incorporated attributes; and a data receiver that receives from the server apparatus data according to a delivery service corresponding to the authentication level which is selected, from a plurality of delivery services, by the server apparatus in accordance with an authentication level specified based on the incorporated attributes included in the user specifying information transmitted by said specifying information transmitter, wherein the authentication level to be specified is different depending on the incorporated attributes within the user specifying information, and the plurality of delivery services are different from one another according to the authentication level.

2. A communication terminal apparatus according to claim 1, wherein the plurality of pieces of user specifying information include at least appliance identifying information that specifies the communication terminal apparatus and user identification information that specifies a user.

3. A delivery system comprising:

a server apparatus that provides a delivery service; and a communication terminal apparatus that receives the delivery service from said server apparatus, the communication terminal apparatus being connected to said server apparatus via a network, for communication therewith;

said communication terminal apparatus comprising a setting device that includes a plurality of authentication buttons each dedicated for selecting one of ON status and OFF status regarding one of a plurality of different attributions by a user, and incorporates one or more attributes, selected as ON status by one of more of the plurality of authentication buttons, as user specifying information, wherein each combination of ON status or OFF status of the plurality of different attributes corresponds to a different authentication level to be desired by the user, a specifying information transmitter that transmits concurrently to the server apparatus the user specifying information including the incorporated attributes, and a data receiver that receives from the server apparatus data according to a delivery service corresponding to the authentication level which is selected, from a plurality of delivery services, by the server apparatus in accordance with an authentication level specified based on the incorporated attributes included in the user specifying information transmitted by said specifying information transmitter, wherein the authentication level to be specified is different depending on the incorporated attributes within the user specifying information, and the plurality of delivery services are different from one another according to the authentication level, and said server apparatus comprising a specifying information receiver that receives the user specifying information from the communication terminal apparatus, an authentication device that specifies, from a plurality of authentication levels, the authentication level of the user of the communication terminal apparatus in accordance with the received user specifying information including the incorporated attribute, a data selector that selects the delivery service to be delivered to the user based on the authentication level specified by said authentication device, and a data transmitter that transmits data according to the delivery service selected by said data selector to the communication terminal apparatus.

* * * * *